US009410355B2

(12) United States Patent
Suggs et al.

(10) Patent No.: US 9,410,355 B2
(45) Date of Patent: Aug. 9, 2016

(54) SAFES AND RELATED LOCKING ENCLOSURES

(71) Applicant: Rhino Metals, Inc., Caldwell, ID (US)

(72) Inventors: Donald Suggs, Boise, ID (US); Scott Moore, Nampa, ID (US); Jayson Nelson, Caldwell, ID (US)

(73) Assignee: RHINO METALS, INC., Caldwell, ID (US)

( * ) Notice: Subject to any disclaimer, the term of this patent is extended or adjusted under 35 U.S.C. 154(b) by 437 days.

(21) Appl. No.: 13/851,843

(22) Filed: Mar. 27, 2013

(65) Prior Publication Data

US 2014/0182489 A1 Jul. 3, 2014

Related U.S. Application Data

(60) Provisional application No. 61/748,376, filed on Jan. 2, 2013.

(51) Int. Cl.
*E05G 1/04* (2006.01)
*F16D 43/20* (2006.01)

(52) U.S. Cl.
CPC . *E05G 1/04* (2013.01); *F16D 43/20* (2013.01)

(58) Field of Classification Search
CPC .. B25B 23/141; B25B 23/14; B25B 23/1427; Y10T 408/6771; Y10T 74/18696; Y10T 408/72; Y10T 477/757; Y10T 74/20744; Y10T 83/8719; F16D 43/20; F16D 41/07; F16D 7/10; E05G 1/04
USPC ............................ 70/422, 222, 223; 109/59 R
See application file for complete search history.

(56) References Cited

U.S. PATENT DOCUMENTS

| | | | | |
|---|---|---|---|---|
| 1,611,940 A | * | 12/1926 | Ohmer | 464/37 |
| 1,671,521 A | * | 5/1928 | Fisher | 192/56.5 |
| 1,899,996 A | * | 3/1933 | Sullivan | 70/216 |
| 2,831,383 A | * | 4/1958 | Riess | 81/480 |
| 3,106,274 A | * | 10/1963 | Madsen | 173/93.6 |
| 4,372,433 A | * | 2/1983 | Mitchell et al. | 192/18 R |
| 4,470,277 A | * | 9/1984 | Uyeda | 70/118 |
| 4,679,415 A | * | 7/1987 | Spratt | 70/118 |
| 4,773,240 A | * | 9/1988 | Foshee | 70/222 |
| 4,901,544 A | * | 2/1990 | Jang | 70/218 |
| 4,941,697 A | * | 7/1990 | Fan | 292/336.3 |
| 5,010,755 A | * | 4/1991 | Best | 70/422 |
| 5,040,652 A | | 8/1991 | Fish et al. | |
| 5,245,846 A | * | 9/1993 | James | 70/118 |
| 5,520,427 A | * | 5/1996 | Mader | 292/336.3 |
| 5,619,874 A | * | 4/1997 | Myers | 70/422 |
| 5,651,280 A | * | 7/1997 | Park | 70/472 |
| 5,730,014 A | | 3/1998 | Berger et al. | |
| 5,778,708 A | * | 7/1998 | Crosby et al. | 70/118 |

(Continued)

*Primary Examiner* — Suzanne Barrett
(74) *Attorney, Agent, or Firm* — Phillips Ryther & Winchester; Matthew D. Thayne

(57) ABSTRACT

Safes and related locking enclosures. In some embodiments, the locking enclosures may comprise a crank shaft that may be coupled with a handle. A crank plate may also be coupled with the crank shaft. A clutch mechanism may be coupled with the crank plate and configured to have an engaged configuration and a disengaged configuration. In the engaged configuration, the clutch mechanism may be configured to transfer torque from the crank shaft to the crank plate. In the disengaged configuration, the clutch mechanism may be configured to allow the crank shaft to rotate with respect to the crank plate such that no (or at least reduced) torque from the crank shaft is not transferred to the crank plate.

34 Claims, 11 Drawing Sheets

(56) References Cited

U.S. PATENT DOCUMENTS

| | | | | |
|---|---|---|---|---|
| 5,787,744 | A | 8/1998 | Berger et al. | |
| 5,878,859 | A * | 3/1999 | Borlinghaus et al. | 192/90 |
| 5,904,232 | A | 5/1999 | Shen | |
| 5,916,281 | A | 6/1999 | Kester et al. | |
| 5,916,325 | A | 6/1999 | Madrid et al. | |
| 5,934,117 | A | 8/1999 | Shen | |
| 6,029,484 | A | 2/2000 | Jetton | |
| 6,058,751 | A | 5/2000 | Dimig et al. | |
| 6,094,951 | A | 8/2000 | Cusati | |
| 6,131,428 | A | 10/2000 | Wildman | |
| 6,178,794 | B1 | 1/2001 | Eller et al. | |
| 6,216,500 | B1 | 4/2001 | Kang | |
| 6,286,347 | B1 | 9/2001 | Frolov | |
| 6,318,134 | B1 | 11/2001 | Mossberg et al. | |
| 6,351,976 | B1 | 3/2002 | Chen | |
| 6,523,382 | B1 | 2/2003 | Dimig et al. | |
| 6,527,314 | B2 | 3/2003 | Brown | |
| 6,546,765 | B1 | 4/2003 | Linares | |
| 6,557,909 | B2 | 5/2003 | Morris | |
| 6,631,930 | B2 | 10/2003 | Haglund | |
| 6,662,603 | B2 | 12/2003 | Morris | |
| 6,679,087 | B2 | 1/2004 | Suggs et al. | |
| 6,845,642 | B2 | 1/2005 | Imedio Ocana | |
| 6,851,287 | B1 | 2/2005 | Yang et al. | |
| 6,865,993 | B2 | 3/2005 | Bartel et al. | |
| 6,908,126 | B2 | 6/2005 | Senger | |
| 7,007,526 | B2 | 3/2006 | Frolov et al. | |
| 7,096,801 | B2 | 8/2006 | Bartel et al. | |
| 7,275,401 | B1 * | 10/2007 | Zimmerman | 70/379 R |
| 7,275,402 | B2 | 10/2007 | Luling et al. | |
| 7,516,709 | B2 | 4/2009 | Bartel et al. | |
| 7,665,405 | B2 * | 2/2010 | Evans et al. | 109/59 R |
| 7,757,524 | B2 | 7/2010 | Frolov et al. | |
| 7,870,770 | B2 | 1/2011 | Blanch | |
| 7,918,117 | B2 | 4/2011 | Frolov et al. | |
| 8,141,400 | B2 | 3/2012 | Sorensen et al. | |
| 8,176,761 | B2 | 5/2012 | Sorensen et al. | |
| 8,292,336 | B2 | 10/2012 | Moon | |
| 8,316,959 | B2 * | 11/2012 | Roehm | B23B 45/008 173/176 |
| 8,340,850 | B2 * | 12/2012 | Muta et al. | 701/22 |
| 8,347,665 | B2 * | 1/2013 | Rasmussen et al. | 70/91 |
| 8,479,543 | B2 * | 7/2013 | Yang et al. | 70/118 |
| 8,539,801 | B2 * | 9/2013 | Calleberg | 70/222 |
| 8,555,793 | B2 * | 10/2013 | Maniaci | 109/59 T |
| 8,677,792 | B2 * | 3/2014 | Wheeler | 70/472 |
| 2009/0078011 | A1 | 3/2009 | Avni | |
| 2009/0211319 | A1 | 8/2009 | McCormack | |
| 2011/0079057 | A1 | 4/2011 | Frolov et al. | |
| 2011/0174587 | A1 | 7/2011 | Rasmussen et al. | |

* cited by examiner

SAFES AND RELATED LOCKING ENCLOSURES

RELATED APPLICATIONS

This application claims priority to U.S. Provisional Patent Application No. 61/748,376 filed Jan. 2, 2013 and titled "SAFES & RELATED LOCKING ENCLOSURES," which application is incorporated herein by reference in its entirety.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
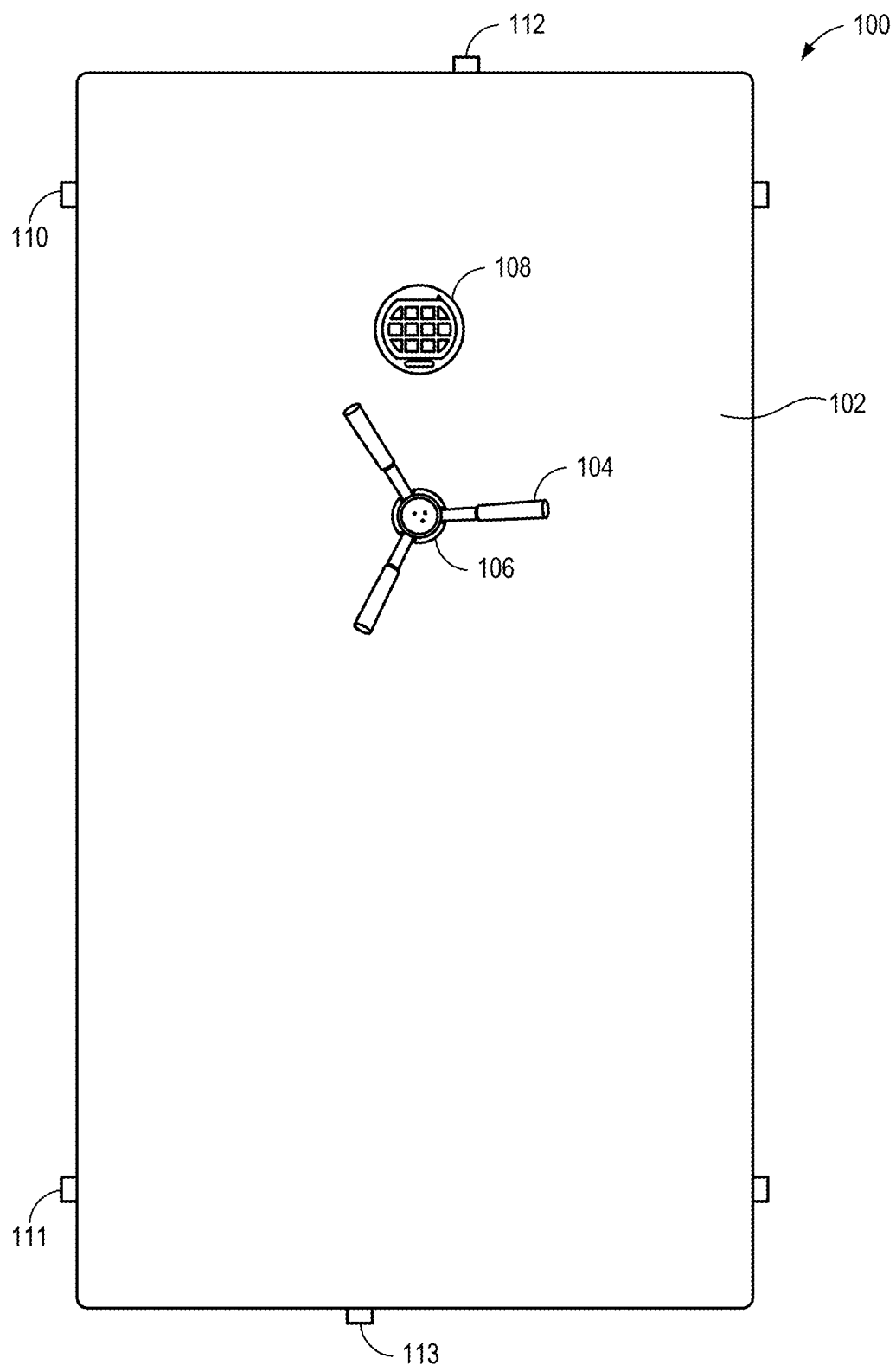
FIG. 1 is a front elevation view of one embodiment of a safe door.

The present disclosure provides various embodiments of safes and other locking enclosures. In some embodiments, the safes may be specifically configured for storing guns or other weapons.

In some embodiments, the safe or locking enclosure may comprise a torque-limiting clutch. In some embodiments, the clutch may comprise a torque-limiting clutch that limits the amount of force that a user can apply to a lock mechanism from a crank handle. Thus, if a prospective purchaser in a retail store, user, or burglar, for example, applies force to the crank handle without having entered the correct lock combination, used a correct key, or otherwise without having been validated as an authorized user of the safe, the crank handle will be allowed to turn without transferring excessive force to one or more components of the safe, such as a lock mechanism. Similarly, the clutch may be disengaged in the event that a user, authorized or not, applies force to the crank handle in the wrong direction. This may serve as a security feature and/or a feature to provide for a more robust product that is less prone to inadvertent user damage and therefore less prone to returns, warranty issues, and the like.

Some embodiments may additionally, or alternatively, comprise one or more features to prevent, or at least limit, the transfer of force applied along the axis of a shaft coupled with the crank handle to other critical, internal components of the safe. In this manner, a would-be thief, for example, will be unable, or at least thwarted in his efforts, to access the interior of the safe by pulling or pushing on this shaft.

Some embodiments may comprise one or more "failsafe" or backup features so as to further protect a lock mechanism, and/or one or more other components of the safe, in the event of unwanted rotation of the crank shaft, such as may result from tampering of the safe. Some such backup features may also prevent unwarranted access to the interior of the safe. For example, some embodiments may be configured such that the crank shaft is coupled with the clutch and/or lock in such a way that the coupling will break or otherwise fail before sufficient force/torque is applied to the shaft to result in damage to and/or opening of the safe. For example, some embodiments may comprise a shaft having a cross-section configured to match and fit within a corresponding opening within the clutch. The material used to form the shaft and/or the opening within the clutch, however, may be configured to fail such that rotation of the shaft no longer rotates the clutch and, therefore, no further torque may be applied to a lock tongue and/or another internal component of the safe normally coupled with the shaft.

In one more specific example, at least a portion of the crank shaft may have a rectangular-shaped cross-section that may fit within a corresponding aperture having an identical or at least similar rectangular shape. The aperture and rectangular portion of the crank shaft, however, may be configured such that, upon application of a predetermined amount of force less than the force needed to damage other internal mechanisms of the safe and/or unlock the safe door, the corners of the aperture and/or the rectangular portion of the shaft may fail such that the shaft is no longer coupled with the clutch. For example, the rectangular portion of the shaft may deform such that it rotates freely within the rectangular aperture of the clutch. Alternatively, the rectangular aperture of the clutch may deform such that, again, the shaft may rotate freely within the (now no longer rectangular) aperture.

In embodiments comprising a clutch, as described above, ordinarily the clutch would prevent the crank shaft from delivering undue force to an internal lock and/or other components of the safe. However, in the event that a burglar was familiar enough with the safe design, it is possible that a hole could be drilled through the door to allow for access to the clutch and/or crank plate. If a burglar drilled such a hole and somehow connected the clutch with the crank plate with a screw, pin, or the like, the clutch's function could potentially be bypassed to allow the crank plate and the body of the clutch to rotate together without allowing the clutch to operate properly to prevent unwanted torque from being transferred to a lock tongue and/or another critical internal component that could be damaged or allow for unlocking the safe. By providing a failsafe feature, such as the features discussed above, transfer of torque forces necessary to defeat and/or damage a safe lock may be prevented even in the event of such relatively sophisticated tampering.

Certain embodiments of the safes discussed above will now be discussed in greater detail with reference to the accompanying drawings. FIG. 1 depicts the front side of a safe 100. As shown in this figure, safe 100 comprises a door 102 and a crank handle 104 extending from a crank handle hub 106. A plurality of locking bolts is shown extending from the top and side of door 102. More particularly, locking bolts 110 and 111 are shown extending from one side of door 102 and locking bolts 112 and 113 are shown extending from a top surface and a bottom surface of door 102, respectively. In other embodiments, however, locking bolts may be additionally, or alternatively, configured to extend from one or more corners adjacent to the safe door.

A locking mechanism 108 is also depicted in FIG. 1. Locking mechanism 108 comprises a keypad to allow a user to input a lock combination in order to open door 102 and access the contents of safe 100. Of course, those of ordinary skill in the art will appreciate that a wide variety of alternative locking mechanisms may be used in place of a locking mechanism using a keypad entry, such as key locks, dial combination locks, electronic locks using touchscreen entry, biometric locks, and the like.

Figure 2:
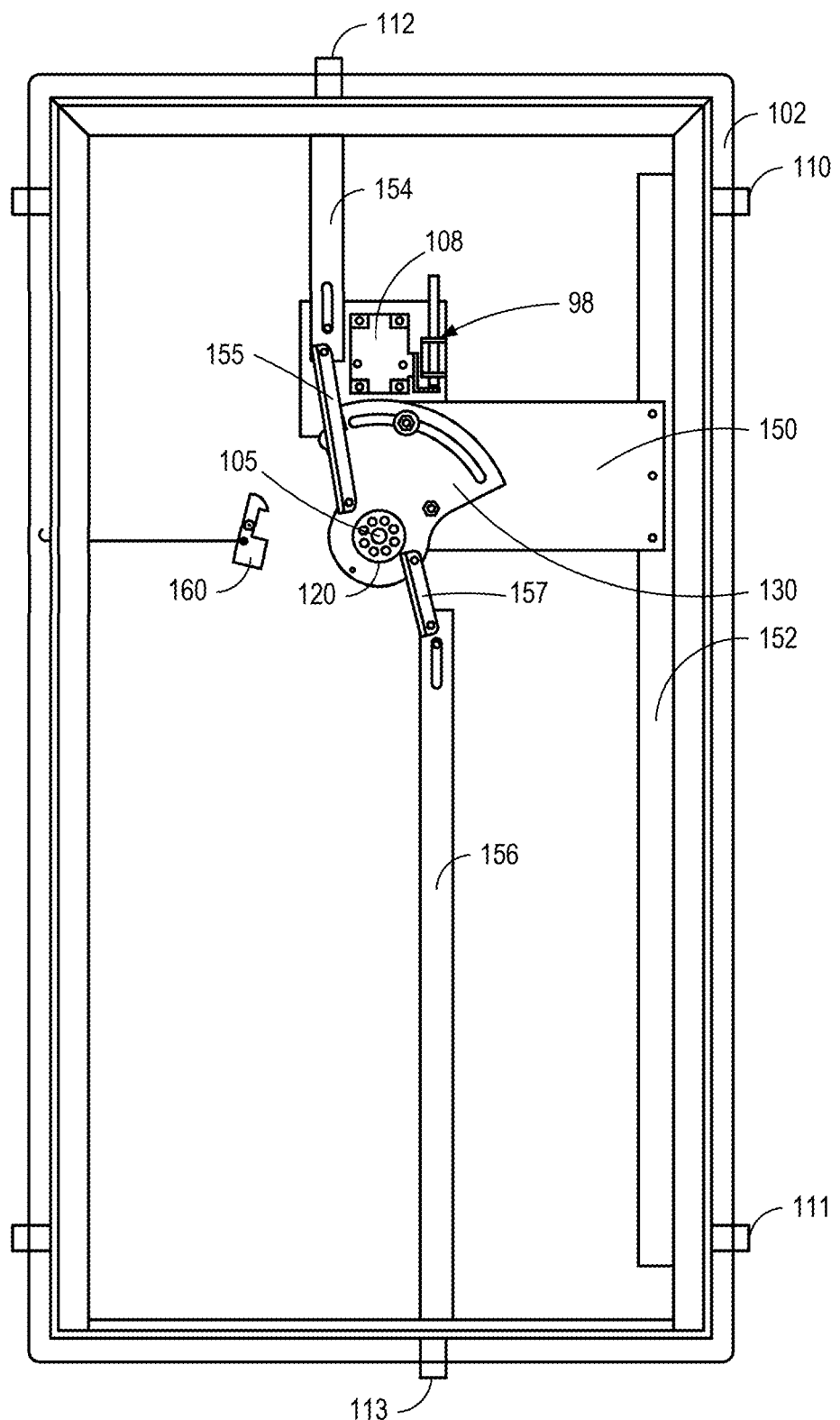
FIG. 2 is an elevation view of one embodiment of a safe door comprising various locking components.

FIG. 2 illustrates a rear surface of door 102. As shown in this figure, safe 100 further comprises a clutch 120 and rotatable crank plate 130. Clutch 120 and rotatable crank plate 130 are both coupled about crank shaft 105. Clutch 120, which is described in greater detail below, is shown with certain components in phantom in clutch 120 to better illustrate its functionality. The functionality of clutch 120 will be described in greater detail below. As also described in greater detail below, rotatable crank plate 130 is also coupled with an actuation member 150, which, in turn, is coupled to a side actuation member 152. Those of ordinary skill will appreciate, however, that some alternative embodiments may lack any such additional actuation members, and others may comprise additional actuation members. Side actuation member 152 is coupled with locking bolts 110 and 111. As such, when rotatable crank plate 130 is rotated about crank shaft 105, actuation member 150 is forced laterally, which causes locking bolts 110 and 111 to either recede from an opening (not shown) in the safe or protrude into this opening, depending upon which direction rotatable crank plate 130 is rotated. More particularly, rotation of rotatable crank plate 130 about crank shaft 105 forces actuation member 150 into a translational motion towards (or away from) one side of the safe door. This results in locking or unlocking of the safe, or at least these particular locking bolts. Those of ordinary skill in the art will appreciate that the number of locking bolts in the depicted embodiment is only an example. Other embodiments are contemplated in which fewer (as few as one) or more locking bolts are provided.

FIG. 2 also illustrates that safe 100 further comprises an upper actuation member 154 and a lower actuation member 156. Upper actuation member 154 is pivotably coupled to rotatable crank plate 130 via a link piece 155 and lower actuation member 156 is pivotably coupled to rotatable crank plate 130 via link piece 157. Rotation of rotatable crank plate 130 in a first direction not only results in retraction of locking bolts 110 and 111, but also results in retraction of locking bolts 112 and 113. Similarly, rotation of rotatable crank plate 130 in a second direction opposite from the first direction results in advancement of locking bolts 110 and 111, and also results in advancement of locking bolts 112 and 113, due to the presence of actuation members 154 and 156, and the presence of corresponding link pieces 155 and 157.

Each of the various actuation members and accompanying link pieces may be aligned for over-center protection. More particularly, these elements may be configured and positioned such that force applied to their respective locking bolts will result in torque to crank plate 130 towards a locked configuration. As such, any tampering with these locking bolts by punching them will not result in opening of the safe and/or will not result in a transfer of any force to locking mechanism 108 and/or lock tongue 114.

A locking piece 160 is also shown in FIG. 2, which may be configured to couple with a portion of rotatable crank plate 130 to maintain the safe locking mechanism in an open configuration. For example, as illustrated in other drawings (see, e.g., FIG. 5), rotatable crank plate 130 may comprise a slot 131 configured to engage with locking piece 160 once rotatable crank plate 130 has been rotated to an open position. More particularly, slot 131 comprises a locking piece engagement surface 132 that is configured to engage with a hooked portion of locking piece 160. In the depicted embodiment, locking piece engagement surface 132 is angled to at least substantially match an angled surface on locking piece 160.

Figure 3:
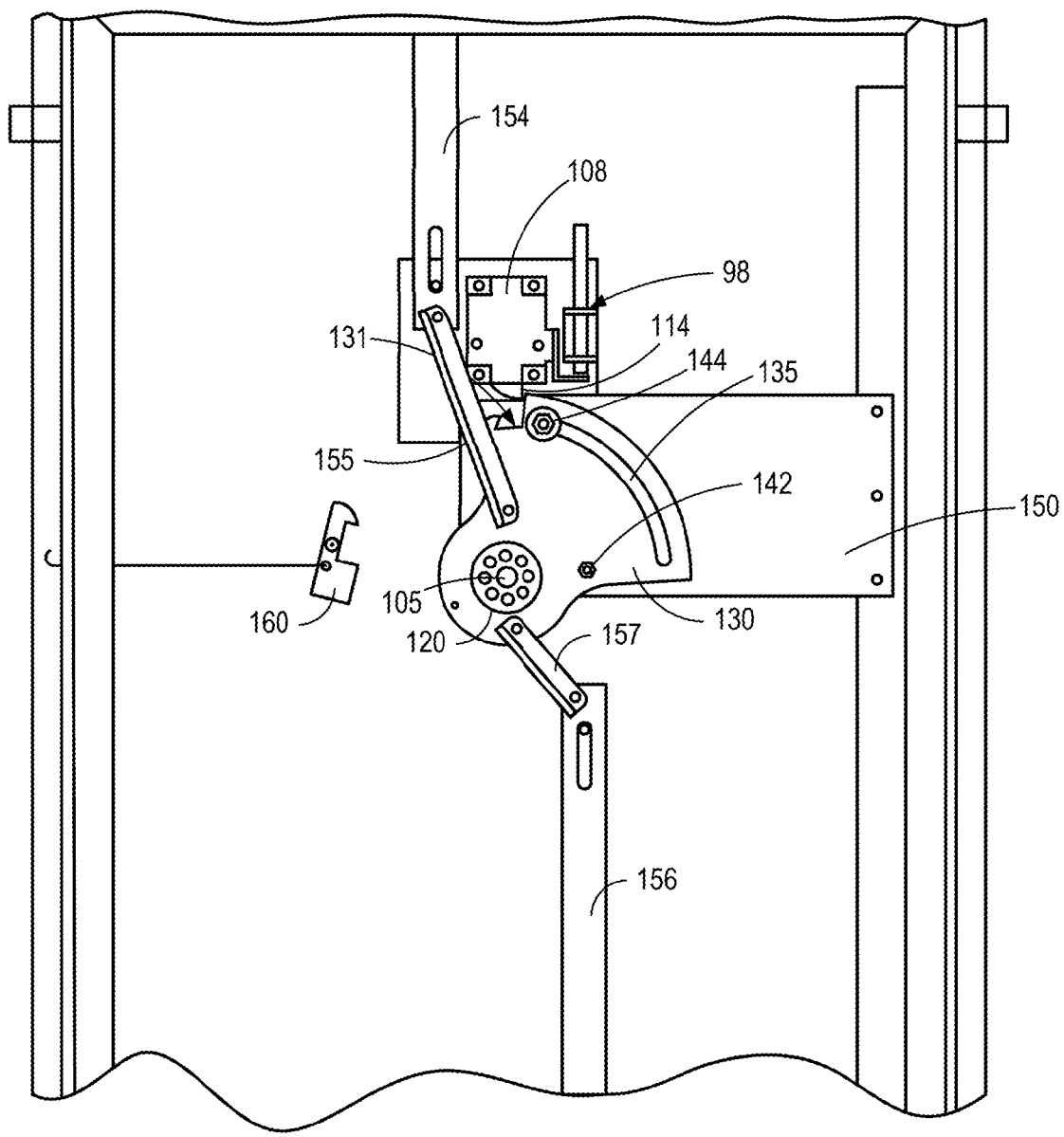
FIG. 3 is a close-up view of certain components of one embodiment of a safe in a locked configuration.

FIG. 3 illustrates the rotatable crank plate 130 in a locked position. In this position, a lock tongue 114, which is part of locking mechanism 108, is engaged with slot 131 to prevent crank plate 130 from being rotated about crank shaft 105. More particularly, surface 133 of slot 131 (see FIG. 5) is engaged with lock tongue 114 (or engages with surface 133 upon a small amount of rotation of crank plate 130 to provide a bit of "play") to prevent crank plate 130 from being rotated about crank shaft 105 to unlock the safe by withdrawing the various locking bolts from the frame of the safe. Alternatively, in embodiments comprising an actuation member 150 that comprises a flange 158, as described below in connection with FIG. 6, the actuation member 150 may be configured to engage lock tongue 114. In other embodiments, however, other components may instead be configured to engage lock tongue 114.

Figure 4:
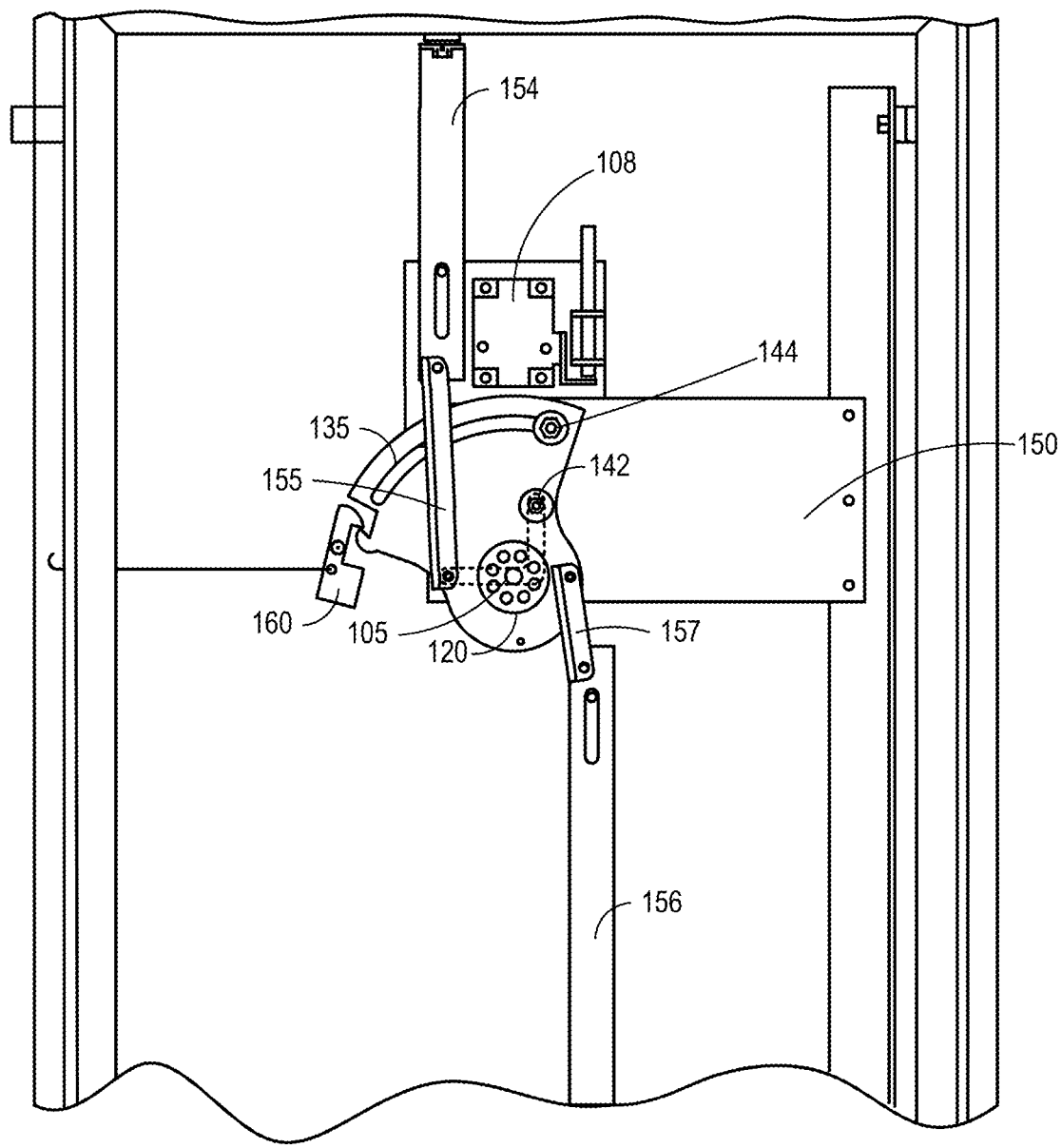
FIG. 4 is a close-up view of the safe components of FIG. 3 shown in an unlocked configuration.

Upon entering a correct combination, locking mechanism 108 may be configured to release lock tongue 114 such that rotation of rotatable crank plate 130 in one direction causes lock tongue to recede into locking mechanism 108 and allow crank plate 130 to be rotated in order to unlock the safe. FIG. 4 illustrates the rotatable crank plate 130 in an unlocked position. As also shown in this figure, once crank plate 130 has been fully rotated in an unlocking direction, safe 100 may be configured to engage locking piece 160 with slot 131 in crank plate 130. Locking piece 160 may be configured to be biased in a direction that automatically results in such engagement. Some embodiments may therefore be configured with a release mechanism that may be used to unlock/disengage locking piece 160 from slot 131. In some such embodiments, the crank plate 130 may be functionally coupled with a release mechanism such that rotation of the crank plate 130 in a locking direction automatically results in releasing of locking piece 160 from crank plate 130. Alternatively, some embodiments may be configured such that closing of the safe door releases locking piece 160 from crank plate 130.

As also shown in these drawings, crank plate 130 overlaps with actuation member 150. At the locked position, crank plate 130 substantially overlaps with actuation member 150. At the unlocked position, crank plate 130 partially overlaps with actuation member 150. By providing these two components in an overlapping configuration, additional security may be provided. More particularly, a would-be thief would have to bend or destroy the actuation member 150 in order to access the crank plate 130 in order to even attempt to rotate the crank plate 130 in an effort to retract the various locking bolts from their locked positions.

Figure 5:
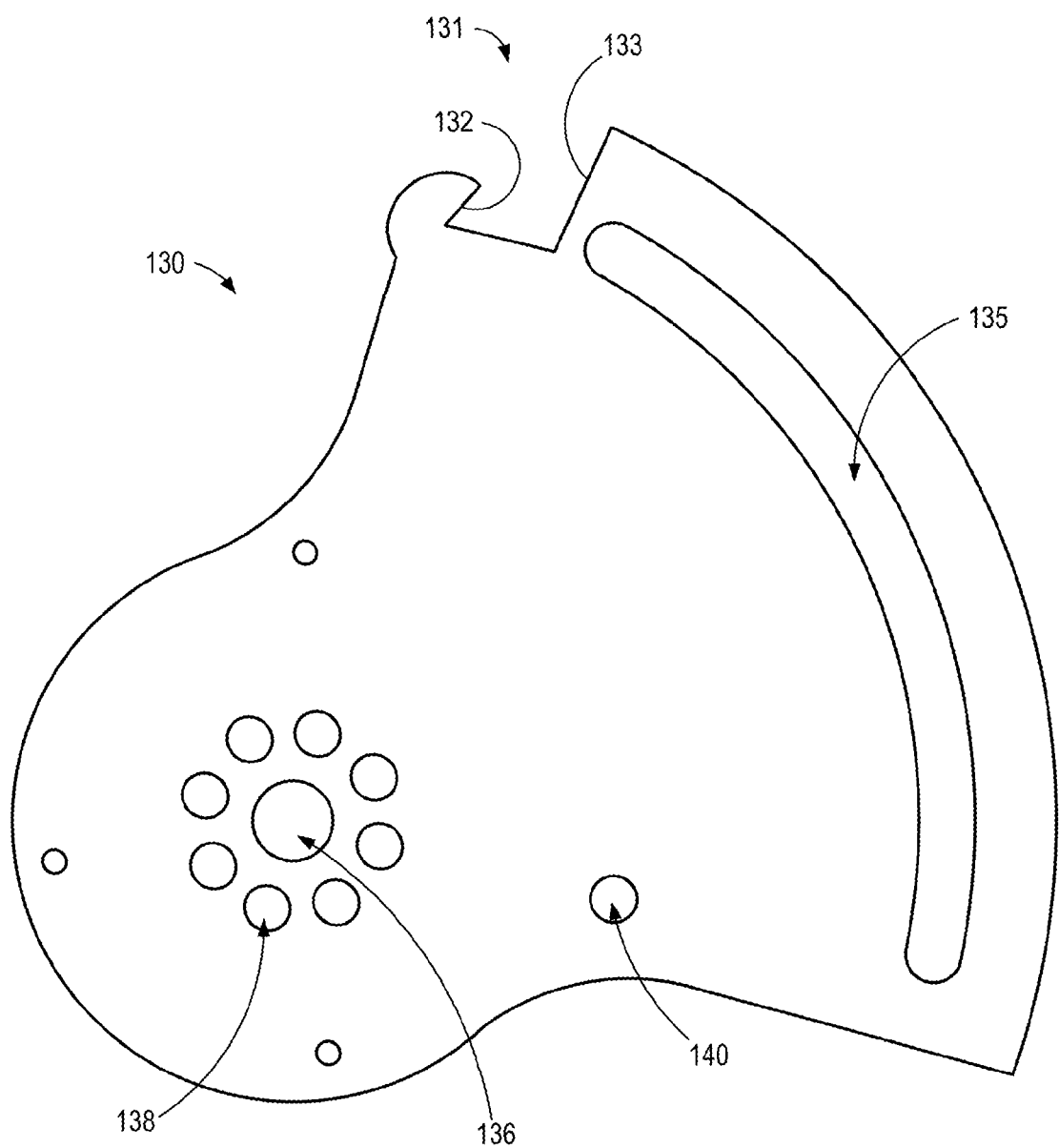
FIG. 5 is an elevation view of an embodiment of a crank plate.

FIG. 5 depicts an embodiment of crank plate 130. As shown in this figure, crank plate 130 comprises a slot 131. As described above, slot 131 comprises a locking piece engagement surface 132 that is configured to engage with a portion of locking piece 160 and surface 133 of slot 131 is configured to engage with lock tongue 114. Crank plate 130 also comprises a curved slot 135 that extends about an arc adjacent to the perimeter of crank plate 130. A crank shaft opening 136 is positioned at the center of one or more radially positioned ball bearing openings 138. As discussed below, ball bearing openings 138 may be configured to receive a corresponding plurality of ball bearings that may be included with clutch 120.

Crank plate 130 further comprises a coupling opening 140 that may be configured to receive a first coupling member 142

(see FIG. 4) therethrough in order to couple crank plate 130 to actuation member 150, as described in greater detail below. A second coupling member 144 may also be used to couple crank plate 130 to actuation member 150. The combination of coupling members 142 and 144 may be used to couple crank plate 130 to actuation member 150 in such a manner that rotation of crank handle 104 results in rotation of crank plate 130, which results in a horizontal movement of actuation member 150, which results in movement of the various locking bolts to lock/unlock door 102. The manner in which crank plate 130 is coupled with actuation member 150 also results in several unique security benefits, as described below.

Figure 6:
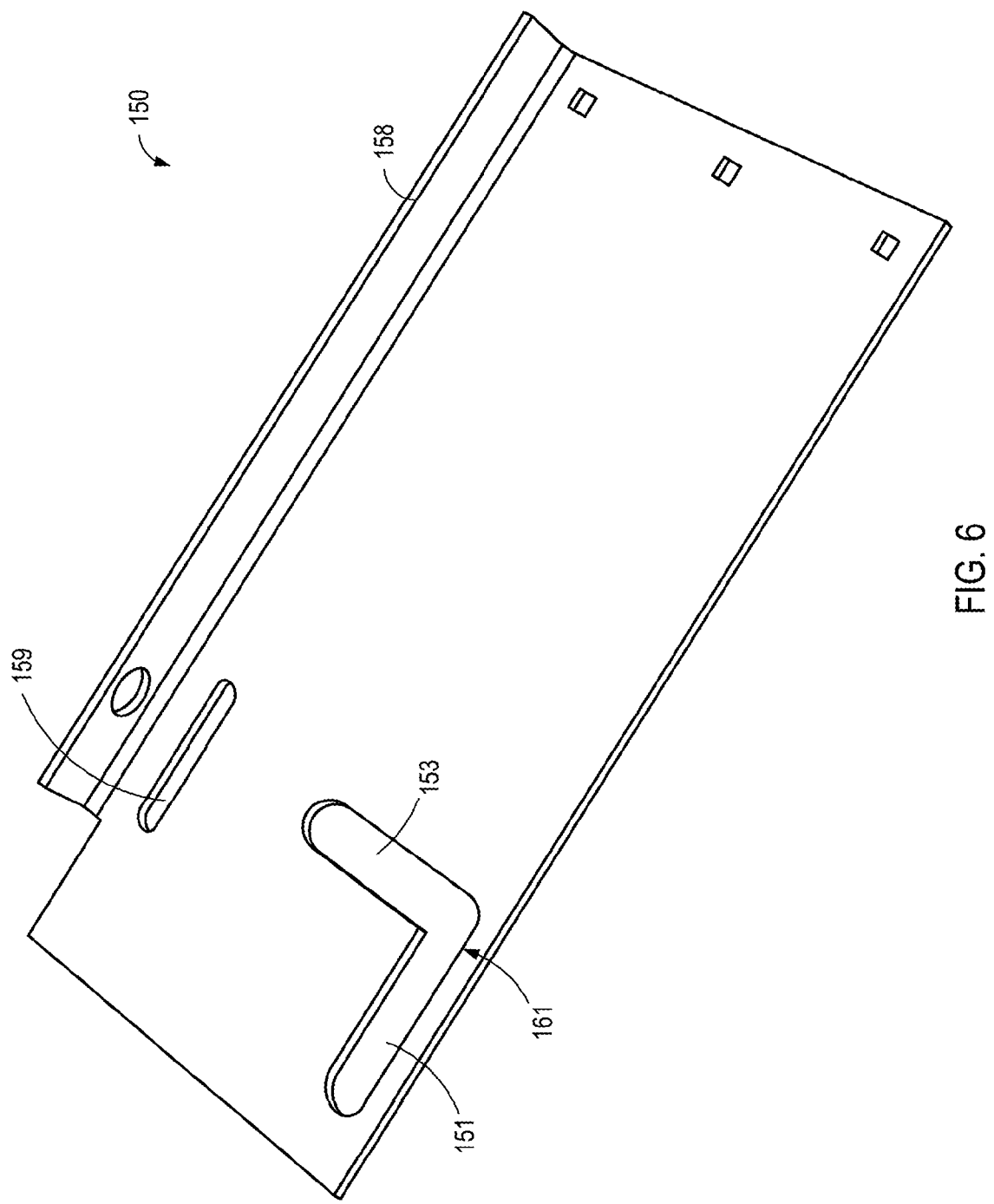
FIG. 6 is a perspective view of an embodiment of an actuation member.

FIG. 6 depicts an embodiment of actuation member 150. As shown in this figure, actuation member 150 comprises an L-shaped slot 161 and a straight slot 159. L-shaped slot comprises a first leg 153 and a second leg 151 that extends at least substantially perpendicular to first leg 153. In the depicted embodiment, actuation member 150 also comprises a flange 158. Flange 158 may be formed at least substantially at a right angle relative to the surface of actuation member 150 within which slots 161 and 159 are formed. Flange 158 may be further configured to contact locking tongue 114 of locking mechanism 108, as described above. However, in some embodiments, flange 158 need not be configured to engage locking tongue 114. Instead, flange 158 may be configured to provide additional structure/support and/or may be configured with an opening to engage another locking mechanism, such as a re-locker 98.

Crank plate 130 and actuation member 150 are configured such that, when first coupling member 142 is used to couple crank plate 130 and actuation member 150, crank plate 130 may not rotate about its axis without moving the actuation member 150 laterally. More particularly, first coupling member 142 is positioned through opening 140 in crank plate 130 and through the first leg 153 of the L-shaped slot 161 to couple actuation member 150 with the crank plate 130. Crank handle shaft 105, which extends through clutch 120, also extends through the second leg 151 of L-shaped slot 161, and through crank shaft opening 136 in crank plate 130.

Second coupling member 144 may be attached to an interior wall of the safe door 102, and may extend through straight slot 159 formed within the actuation member 150 and through the curved slot 135 formed within crank plate 130. Alternatively, second coupling member 144 may be coupled with another interior component, such as an intermediary structure, that is itself coupled with the door 102. In a locked position, the first coupling member 142 and the crank handle shaft 105 are aligned at least substantially parallel to the direction of travel of the actuation member 150, and the first coupling member 142 is positioned in first leg 153 of the L-shaped slot 161 in between the crank handle shaft 105 and the door bolts. This configuration provides additional reinforcement to prevent the crank plate 130 from being forced in any direction without properly unlocking the locking mechanism 108 associated with the lock combination. More particularly, any force directed from lock bolts 110 and/or 111 upon actuation member 150 will be primarily transferred to the corner at which first leg 153 meets second leg 151 rather than being transferred as a torque upon crank plate 130 and/or upon lock tongue 114.

As the crank handle is turned, the first coupling member 142 is moved from a first end of first leg 153 to an opposite end of first leg 153, and the crank handle shaft 105 moves from a first end of second leg 151 to its opposite end, which corresponds with the location that the first coupling member 142 formerly occupied within L-shaped slot 161. Further, the crank handle shaft 105 and the first coupling member 142 are restrained within L-shaped slot 161 to guide and support actuation member 150 throughout its movement.

The second coupling member 144 is fixedly coupled with the door of the safe, and extends through a slot 159 in actuation member 150, and also extends through curved slot 135. As the handle moves from a locked position to an unlocked position, the second coupling member 144 moves from an upper end of curved slot 135 to a lower end of curved slot 135. This provides additional support to prevent tampering and improve performance.

Figure 7:
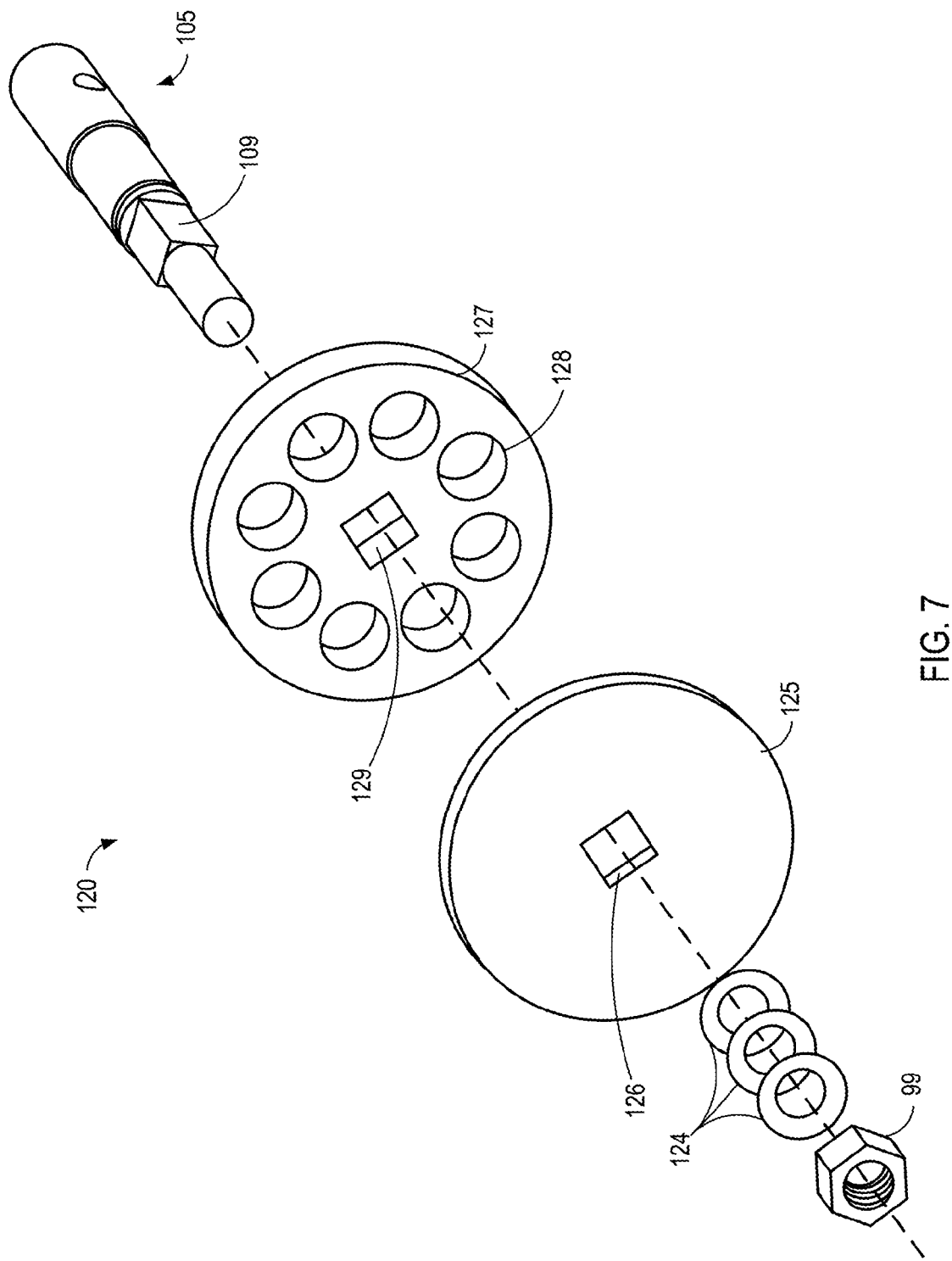
FIG. 7 is an exploded view of an embodiment of a clutch mechanism.
Figure 8:
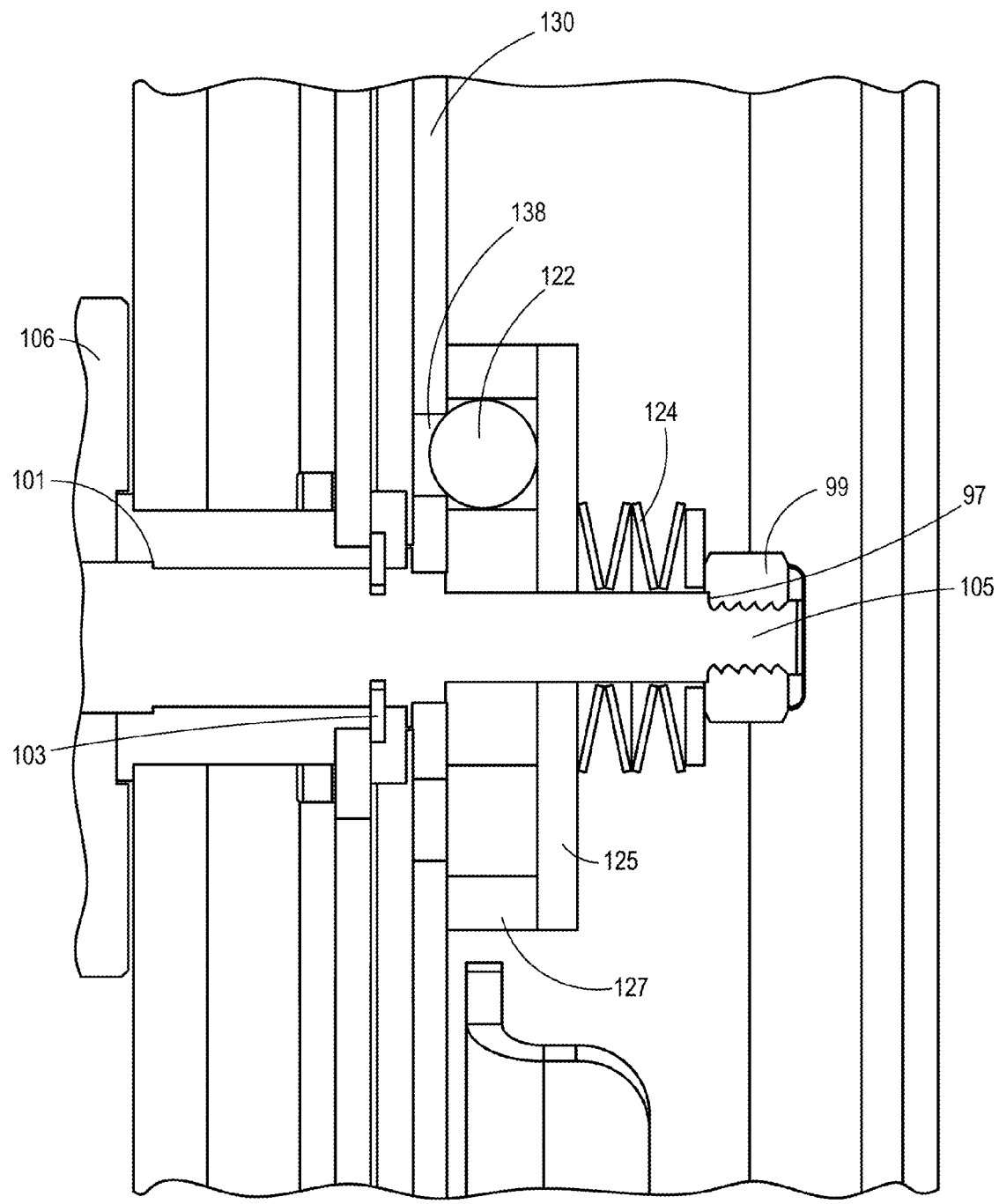
FIG. 8 is a cross-sectional view depicting an embodiment of a clutch mechanism in an engaged configuration.
Figure 9:
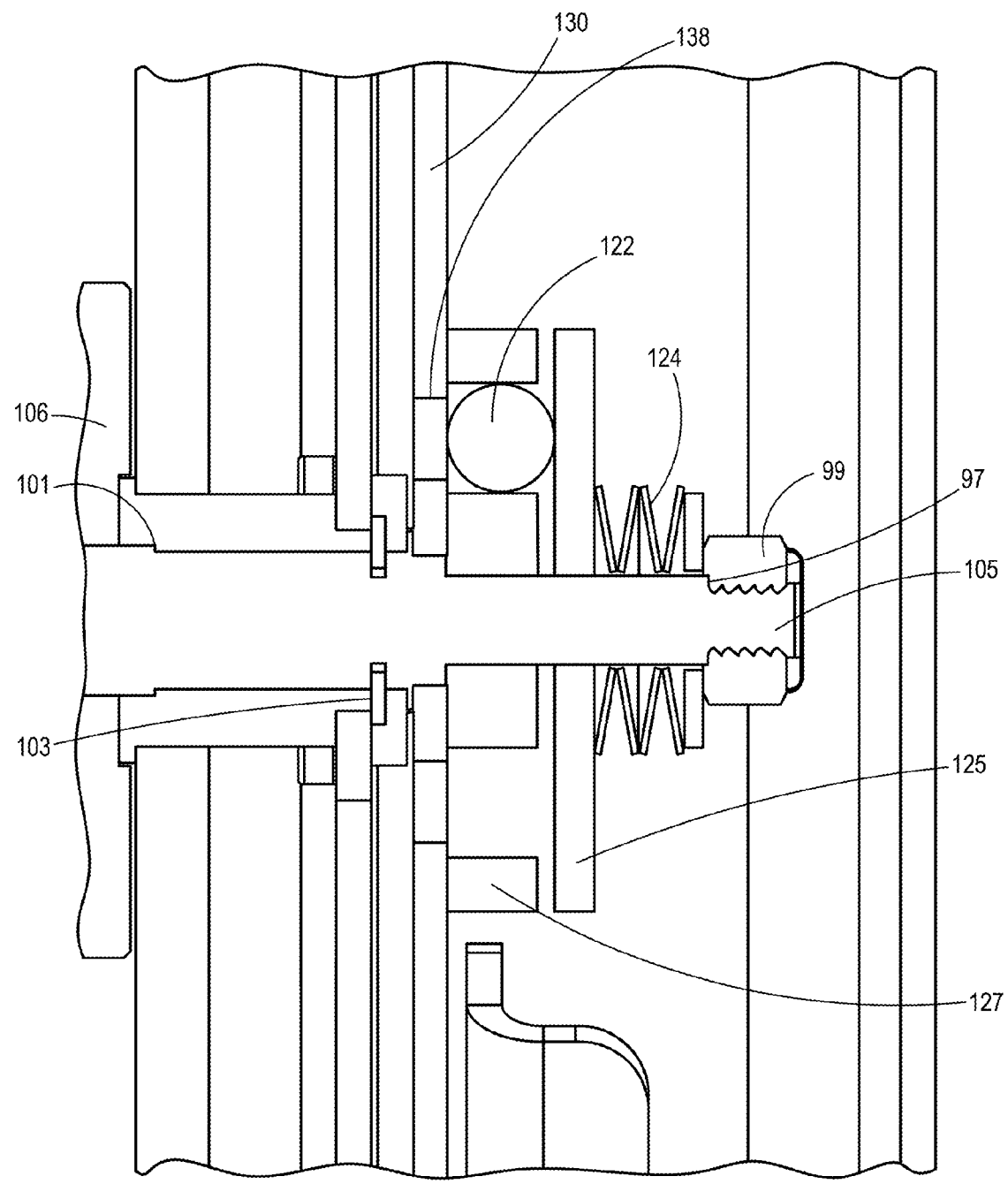
FIG. 9 is a cross-sectional view of the clutch mechanism of FIG. 8 shown in a disengaged configuration.

FIGS. 7-9 depict an embodiment of a clutch mechanism 120. FIG. 7 is an exploded view of clutch mechanism 120. Clutch mechanism 120 comprises a clutch housing 127, a cover 125, one or more ball bearings 122, and one or more spring members 124. Clutch housing 127 comprises one or more ball bearing openings 128 and a central crank shaft opening 129. Cover 125 also comprises a crank shaft opening 126.

As shown in FIG. 7, crank handle shaft 105 comprises a keyed section 109 that may be configured with a cross-sectional shape that matches the shape of openings 126 and/or 129. As such, when crank handle 104 is turned, this torque is transferred to clutch housing 127 and/or cover 125. This torque may, in turn, be transferred to crank plate 130 by way of ball bearings 122 and ball bearing openings 138 in crank plate 130, as discussed in greater detail below with reference to FIGS. 8 and 9.

In some embodiments, crank shaft 105 may be coupled with clutch 120 in such a way that the coupling will break or otherwise fail before sufficient force/torque is applied to the shaft to result in damage to and/or opening of the safe. For example, some embodiments may comprise a shaft having a keyed section 109 that is configured to match and fit within a corresponding opening within the clutch 120, and further configured to fail upon application of a predetermined amount of torque. For example, the material and/or dimensions used to form keyed section 109 may be of a substantially lesser strength than the material and/or dimensions of openings 126 and/or 129 such that rotation of shaft 105 will, upon application of a particular amount of torque, deform keyed section 109 such that this rotation no longer results in the rotation of clutch 130 and, therefore, no further torque may be applied to lock tongue 114 and/or another internal component of the safe normally coupled with shaft 105. In other embodiments, however, openings 126 and/or 129 may instead be configured to fail such that the shaft 105 is no longer coupled with the clutch 120.

Those of ordinary skill in the art will appreciate that a wide variety of alternatives may be used to provide a fail-safe mechanism. For example, rather than providing a keyed section and corresponding opening(s) that have a rectangular cross-sectional shape as shown in the drawings, a keyed section and corresponding opening(s) may be formed in a variety of alternative shapes and sizes. For example, in some embodiments, the cross-sectional shape may comprise two at least substantially flat sides connected by curved sides. Other types of polygonal shapes, such as pentagonal, hexagonal, octagonal, etc., shapes may also be used.

After a lock combination has been correctly entered, a locking mechanism 108 is disengaged, which allows the turning of crank handle 104 to result in rotatable crank plate 130 pivoting about crank handle shaft 105, which, in turn, forces actuation member 150 laterally. These actions result in locking bolts 110-113 being withdrawn from corresponding slots or other openings in the safe to allow the safe door 102 to be opened.

When crank handle 104 is turned without first correctly entering the lock combination, the locking mechanism 108 engages crank plate 130 and prevents crank plate 130 from rotating so as to move actuation member 150 laterally. If sufficient force is applied to crank handle 104, instead of transferring the force directly to the actuation member 150, clutch 120 disengages, which allows shaft 105 to rotate without transferring additional force to the crank plate 130.

FIG. 8 is a cross-sectional view of clutch mechanism 120 shown in an engaged configuration. As shown in this figure, ball bearings 122 are positioned so as to partially sit within openings 138 formed within crank plate 130. As such, rotation of shaft 105 rotates clutch housing 127, which imparts rotational force to crank plate 130 by way of ball bearings 122 within openings 138.

One or more spring members 124 may be used to apply force to cover 125 in order to bias ball bearings 122 towards their position partially within openings 138. In the depicted embodiment, Belleville washers are used as spring members 124. Use of such washers may be desirable for certain embodiments because they can be stacked in varying numbers and/or orientations in order to tune the amount of force upon ball bearings 122, spring rate, and/or travel distances of ball bearings 122 to thereby tune the operation/sensitivity of clutch mechanism 120.

For example, in addition to varying the number of spring members, some spring members, such as Belleville washer spring members, may be configured such that altering the orientation of the spring members relative to one another may be used to tune the operation of the clutch. In other words, such washers may be stacked in a nested configuration such that each of the washers, or at least a subset of the washers, are positioned to extend in the same direction or, alternatively, may be stacked such that the washers alternate from one direction to the other, as shown in FIGS. 8 and 9. Of course, such washers may be stacked with two or more nested, followed by two or more nested in an opposite direction, etc. Or such washer may be stacked in any desired combination of stacking orientations and numbers to result in a desired spring force, feel, and functionality. Use of such washers as spring members may also be useful in that wear between ball bearings 122 and crank plate will be compensated for by spring members 124 such that no further adjustment is needed in order to account for such wear.

A retaining nut 99 and/or accompanying washer may also be used to hold the one or more spring members 124 against cover 125, as depicted in FIGS. 8 and 9. Any other types of mechanisms, such as a cap or clip, may also, or alternatively, be used in other embodiments. Nut 99 and spring members 124 may be used in combination to provide additional sensitivity to tune clutch mechanism 120 to a desired torque threshold. However, other embodiments are contemplated in which other types of spring members, such as ordinary compression springs for example, may be used instead.

As mentioned above, when sufficient force is applied to crank handle 104, instead of transferring that torque to crank plate 130, ball bearings 122 recede out of these openings by compressing spring member(s) 124, as illustrated in FIG. 9. Crank handle 104 can thereby rotate without imparting additional force to crank plate 130 and, by virtue of crank plate 130's connection with actuation member 150, can also avoid imparting any additional force to actuation member 150.

Due to fact that ball bearings 122 are used in clutch mechanism 120, these ball bearings 122 may be configured to roll out of their respective recesses (formed by openings 138 in crank plate 130) in clutch plate and roll across the surface of crank plate 130 until the next recess aligns with the bearing.

When the ball bearings 122 are out of their respective recesses, the only contact points are between the ball bearings 122 (sandwiched between clutch cover 125 and crank plate 130). As such, during disengagement, the clutch cover 125 may be configured such that it is not in contact with clutch housing 127 and/or such that the clutch housing 127 is not in contact with crank plate 130. As should be apparent from the figures and accompanying written description, in some embodiments the clutch mechanism 120 may be configured such that the diameter of ball bearings 122 is greater than the thickness of clutch housing 127.

Clutch mechanism 120 may also be configured such that it will automatically re-engage with crank handle 104 in any one of a number of different handle positions, depending upon the number of recesses used. Thus, if a user has unintentionally applied an undue force to the handle, such as by turning the handle in the wrong direction for example, the clutch may be configured to automatically re-engage after a certain amount of rotation in the disengaged configuration. Some embodiments of clutch mechanism 120 may also be installed/used in conjunction with virtually any safe that uses a pivoting or rotatable shaft, which may make it particularly desirable not only for new safes, but also retrofitting and the like.

In some embodiments, clutch mechanism 120 may also be configured to allow for removal/replacement of the clutch mechanism 120 without requiring other disassembly of actuators, linkages etc. For example, in the embodiment depicted in FIG. 10, the crank plate may comprise a plurality of fastener openings such that the clutch mechanism can be coupled with, and removed from, the crank plate directly.

It should be understood that various revisions may be made to the specific embodiments depicted and described herein. For example, although the depicted embodiment includes a clutch mechanism having eight ball bearings, other embodiments are contemplated in which fewer than, or more than, eight ball bearings may be used. In addition, the ball bearings and/or related components, such as the clutch housing and/or crank plate, may vary in size, shape, number, and/or orientation in order to suit particular needs.

It should also be understood that various alternative clutch mechanisms are contemplated. For example, in some embodiments, tapered protruding elements, such as may be used in connection with a dog clutch, may take the place of ball bearings 122. In addition, some embodiments may be formed without a clutch. In some such embodiments, a portion of the safe, such as keyed section 109 discussed above, may be configured to fail to prevent excessive force from being transferred to one or more critical internal components of the safe, such as locking tongue 114 of locking mechanism 108.

Safe 100 may comprise other safety/security features. For example, shaft 105 comprises a shoulder 101 that prevents inward force from being transferred to the actuation member 150, crank plate 130, or other internal components. To prevent outward force from being transferred to such internal components, a circlip 103 may be positioned within a groove around shaft 105, as shown in FIGS. 8 and 9.

It should be understood that, as depicted in FIGS. 8 and 9, the ball bearing openings 128 in clutch housing 127 should be larger than the corresponding ball bearing openings 138 in crank plate 130 such that the ball bearings 122 can extend entirely through the openings 128 in clutch housing 127 but cannot extend entirely through the openings 138 in crank plate 130.

FIGS. 8 and 9 also depict that, in this particular embodiment, shaft 105 further comprises a stepped region having a smaller cross-sectional diameter at its distal end, which forms a ledge 97. Ledge 97 may allow for configuring the clutch mechanism to be preset to a particular spring load. In other words, in some embodiments comprising a ledge 97, the clutch mechanism may be configured to prevent overtightening of retaining nut 99 or another similar retaining member. Some such embodiments may also, or alternatively, be configured to prevent undertightening. In other words, some embodiments may be configured to provide a predetermined amount of force from spring members 124.

To further explain this functionality, ledge 97 may be configured to extend beyond clutch cover 125 by a particular distance. This distance may vary depending upon, for example, the size of the ball bearings, the size of the ball bearing openings, the type and number of spring members used. However, preferably the distance from cover 125 to ledge 97 (or, as discussed below, a thread terminus) is sufficient to accommodate each of the spring members in such a manner that nut 99 cannot fully compress the spring members 124. This is because some play is needed in spring members 124 to allow ball bearings 122 to recede from openings 138 in order for the clutch mechanism 120 to operate properly.

Ledge 97 may prevent nut 99 or another retaining member from being threaded beyond ledge 97 on shaft 105. As such, spring members 124 cannot be compressed against cover 125 further than the distance between ledge 97 and cover 125. Thus, assembly of safe 100 may be simplified since one need not be concerned with the amount of turns/tightening of a nut, for example, on the clutch assembly. Moreover, by so configuring the clutch, a predetermined amount of force can be selected and applied to tune the clutch very precisely to provide a desired functionality and feel.

In alternative embodiments, instead of providing a ledge 97, threads on shaft 105 may simply be configured to terminate at an appropriate location to provide a similar "tuning" functionality. However, providing a ledge 97 instead of simply an appropriately located terminal thread may provide a more preferable feel to an installer and may be more effective in preventing damage and ensuring that the forces applied to the clutch from the spring members 124 are appropriate to ensure proper functionality and desired feel.

In some embodiments, the clutch mechanism may be self-adjusting to account for expected wear during use. For example, depending upon the materials used in the safe and/or uses of the clutch and/or other components of the safe, the points of contact between the ball bearings 122 and the crank plate 130 or other component including openings intended to at least partially received the ball bearings 122 (as discussed below, some embodiments may comprise a clutch coupling member that may allow for retrofitting a clutch mechanism to a safe lacking a crank plate with ball bearing openings) may wear somewhat during use. However, by adjusting the tolerances of the ball bearing openings and/or spring members, any such expected wear can be compensated for to ensure that the forces applied using the clutch mechanism are consistent, irrespective of wear.

For example, Belleville washers may be stacked in different orientations and with different numbers of washers in order to adjust the rate of travel of the spring members/washers and the maximum travel/compression distance of the spring members/washers. Any expected wear between the ball bearings and their corresponding ball bearing openings can therefore be compensated for by adjusting the orientation and number of washers appropriately.

Figure 10:
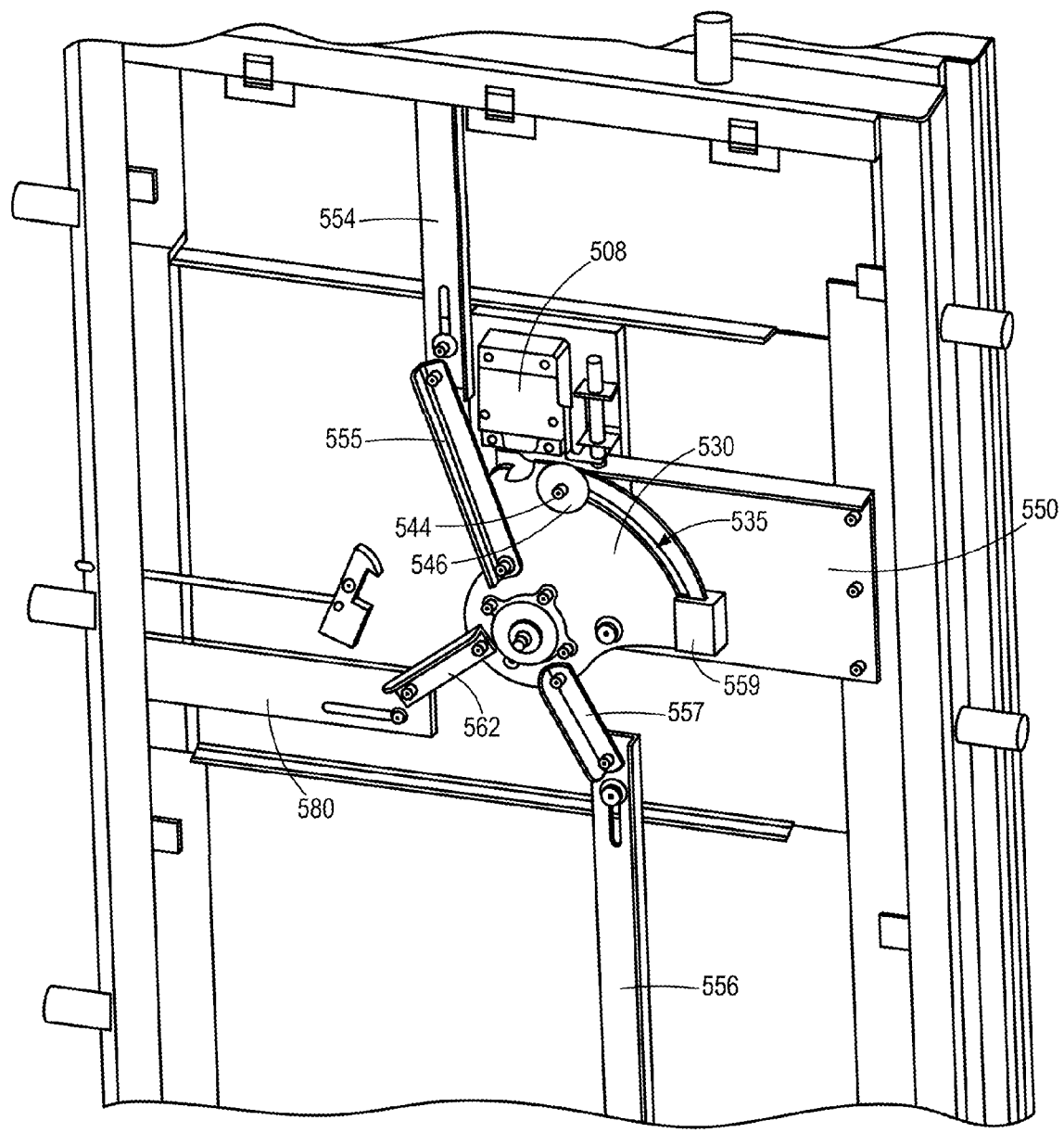
FIG. 10 is an elevation view of an alternative embodiment of a safe door comprising various locking components.

Additional security features are shown in the embodiment of FIG. 10. FIG. 10 depicts the interior of an alternative embodiment of a safe door. In this particular embodiment, a retaining tab 559 is formed on actuation member 550. Retaining tab 559 may be attached to actuation member 550 or, alternatively, may be integrally formed with actuation member 550. As shown in FIG. 10, retaining tab 559 is configured to receive a portion of crank plate 530 therein (at least in a locked configuration). Retaining tab 559 is positioned and configured such that crank plate 530 may rotate within retaining tab 559 and further such that actuation member 550 cannot be moved towards locking mechanism 508 (towards an unlocked configuration) without crank plate 530 rotating. This provides an additional level of security against side punching. For example, if a thief were to attempt to punch the lateral locking bolts, which are coupled with actuation member 550, retaining tab 559 may help prevent such tampering. Also, if a thief were to drill out first coupling member 142, retaining tab 559 may be configured to prevent punching. Some embodiments may comprise multiple layers of redundant protection against such punching, such as with an L-shaped slot, as discussed above, along with a retaining tab.

Retaining tab 559 has two surfaces—one extending adjacent to crank plate 530 in a plane at least substantially perpendicular to the plane in which crank plate 530 moves, as discussed above, and another surface extending at least substantially parallel to the plane in which crank plate 530 moves. As such, at least two independent layers of additional security are provided. As discussed above, the perpendicular surface provides protection against punching of the locking bolts. In addition, the parallel surface restricts movement of crank plate 530 within a plane at least substantially parallel to the principal plane of movement of actuation member 550. This helps prevent a thief from being able to drill through the door and punch the crank plate 530 away from the actuation member 550.

Although the embodiment depicted in FIG. 10 comprises a retaining tab 559 that only encompasses a portion of crank plate 530 in a locked configuration, some embodiments may comprise a retaining tab that is longer so as to allow crank plate 530 to be positioned therein for a longer degree of rotation of crank plate 530. In addition, other elements of the safe may, in some embodiments, also include a corresponding retaining tab. For example, the clutch mechanism may include a similar retaining tab or flange to provide further security. One or more such tabs may also, or alternatively, be positioned adjacent to one or more of the link pieces to help prevent the link pieces from being forced towards the shaft.

Like crank plate 130, crank plate 530 comprises a curved slot 535 in which a coupling member 544 is positioned. Coupling member 544 may comprise a washer 546. Washer 546 may also assist in restricting movement of crank plate 530 and/or actuation member 550 to further prevent punch attacks and tampering.

Like the embodiment depicted in FIGS. 1-4, the embodiment of FIG. 10 comprises an upper actuation member 554 and a lower actuation member 556. Upper actuation member 554 is pivotably coupled to rotatable crank plate 530 via a link piece 555 and lower actuation member 556 is pivotably coupled to rotatable crank plate 530 via link piece 557. Similar to the embodiment of FIGS. 1-4, rotation of rotatable crank plate 530 in a first direction results in retraction of one or more accompanying locking bolts. Similarly, rotation of rotatable crank plate 530 in a second direction opposite from the first direction results in advancement of various locking bolts coupled with the actuation members.

However, unlike the embodiment of FIGS. 1-4, the embodiment of FIG. 10 includes an additional actuation member 580 and accompanying link piece 562. This allows for providing lock bolts along the hinge side of the safe as well, since actuation member 580 may be coupled with one or more locking bolts along the hinge side (the left side of FIG. 10) of the safe door. As with the embodiment of FIGS. 1-4, each of the various actuation members and accompanying link pieces may be aligned for over-center protection to further prevent tampering damage and/or tampering access.

Figure 11:
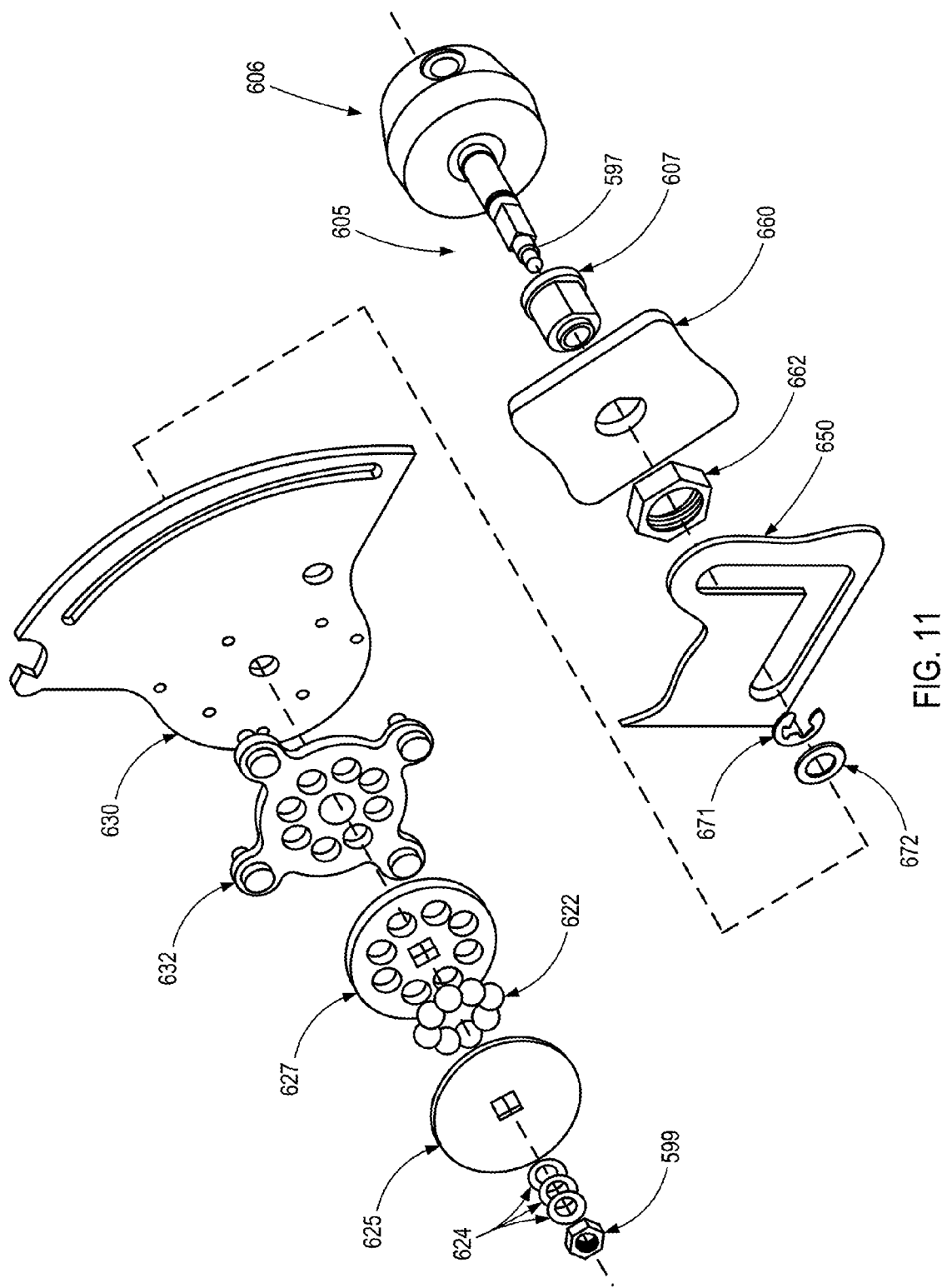
FIG. 11 is an exploded view depicting various alternative components of an embodiment of a safe.

FIG. 11 depicts an exploded view of various alternative components that may be used in, for example, the embodiment of FIG. 10 and/or other embodiments disclosed herein. In the embodiment of FIG. 11, a crank plate 630 is provided, along with various components of a clutch mechanism. The depicted clutch mechanism may comprise a clutch coupling member 632 that may be configured to allow for the clutch mechanism to be retrofitted or otherwise coupled with a safe not specifically configured with and/or for such a mechanism.

To illustrate, unlike crank plate 130, crank plate 630 does not include any ball bearing openings. Thus, clutch coupling member 632, which is configured to be coupled with crank plate 130, includes these openings. The clutch mechanism, which comprises clutch housing 627, ball bearings 622, clutch cover 625, spring members 624, and retaining nut 599, may therefore be coupled to crank plate 630 by positioning clutch coupling member 632 between the clutch mechanism and the crank plate 630. Clutch coupling member 632 may be configured with one or more coupling holes configured to allow clutch coupling member 632 to be coupled to crank plate 630 with a fastener, such as a bolt, screw, nail, pin, rivet, etc. Alternatively, coupling member 632 may be coupled with crank plate 630 using an adhesive, welding, or the like.

It should be understood that the ball bearing openings in clutch housing 627 should be larger than the corresponding openings in clutch coupling member 632 such that the ball bearings 622 can extend entirely through the openings in clutch housing 627 but cannot extend entirely through the openings in clutch coupling member 632. Similarly, as shown in FIGS. 8 and 9, openings 138 in crank plate 130 are smaller than openings 128 in clutch housing 127 such that ball bearings 122 can pass through openings 128 but not through openings 138.

It should also be understood that the clutch coupling member 632 comprises at least one ball bearing opening (a plurality of such openings are depicted in the drawing), and that the clutch mechanism comprises ball bearings 622 that are configured to be partially positioned within the ball bearing openings of the clutch coupling member in the engaged configuration. These ball bearing openings each has a diameter less than a diameter of the ball bearings 622 such that the ball bearings cannot pass through the ball bearing openings.

As such, clutch coupling member 632 may be rigidly coupled with crank plate 630 such that crank plate 630 and clutch coupling member 632 are configured to rotate together. In addition, clutch coupling member 632 is coupled with the clutch mechanism such that, in the engaged configuration (i.e., with ball bearings 622 partially positioned within the openings in clutch coupling member 632), the clutch mechanism (in the depicted embodiment, comprising clutch housing 627, clutch cover 625, ball bearings 622, and spring members 624) is configured to rotate together with the clutch coupling member 632 and, in the disengaged configuration, the clutch mechanism is configured to rotate with respect to clutch coupling member 632.

Some embodiments may be configured such that, upon application of a predetermined amount of torque, the clutch mechanism is configured to disengage to allow the crank shaft to rotate with respect to the clutch housing and/or clutch coupling member. In some embodiments, the predetermined amount of torque may be adjusted by, for example, adjusting the number of spring members used with the clutch mechanism and/or the orientation (i.e., the direction in which the spring members extend relative to one another) of the spring members.

The embodiment of FIG. 11 also comprises a shaft hub 606 that is coupled with a crank shaft 605. Crank shaft 605 is configured to be coupled with a bushing 607, which may be used to couple each of the various locking components with a cross plate 660. Cross-plate 660 may serve as an intermediary structure to allow the depicted lock components to be coupled to a door. Of course, in alternative embodiments, such as the embodiment of FIGS. 1-4, for example, these components may be coupled directly to such a safe door without need for a cross-plate or another intermediary structure.

A bushing nut 662 may be coupled with bushing 607 to secure cross plate 660 therebetween. Finally, similar to the embodiment of FIGS. 1-4, the embodiment of FIG. 11 comprises an actuation member 650 that comprises an L-shaped slot. Crank shaft 605 may be coupled to actuation member 650 with a clip 671 and/or washer 672.

As also depicted in FIG. 11, shaft 605 further comprises a stepped region having a smaller cross-sectional diameter at its distal end, which forms a ledge 597. Ledge 597 may allow for configuring the clutch mechanism to be preset to a particular spring load (and compression). In other words, as described above, in embodiments comprising a ledge 597, the clutch mechanism may be configured to prevent over and/or undertightening of retaining nut 599 or another similar retaining member. In other words, some embodiments may be configured to provide a predetermined amount of force from spring members 624.

As also explained above, in alternative embodiments, instead of providing a ledge 597, threads on shaft 605 may simply be configured to terminate at an appropriate location to provide a similar "tuning" functionality.

It will be understood by those having skill in the art that changes may be made to the details of the above-described embodiments without departing from the underlying principles presented herein. For example, any suitable combination of various embodiments, or the features thereof, is contemplated.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein. Accordingly, this disclosure is to be regarded in an illustrative rather than a restrictive sense, and all such modifications are intended to be included within the scope thereof.

Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined only by the following claims.

The invention claimed is:

1. A locking enclosure, comprising:
   a crank handle;
   a crank shaft coupled with the crank and configured to rotate with the crank handle;
   a locking mechanism, wherein the crank shaft is configured such that, following an unlocking of the locking mechanism, rotation of the crank handle unlocks the locking enclosure to allow for access to an interior of the locking enclosure; and
   a clutch mechanism coupled with the crank shaft, wherein the clutch mechanism comprises:
      a clutch housing;
      at least one ball bearing opening positioned within the clutch housing;
      at least one ball bearing positioned within the at least one ball bearing opening; and
      at least one spring member coupled to the clutch housing,
         wherein the clutch mechanism is configured such that, upon application of a predetermined amount of torque, the clutch mechanism is configured to disengage to allow the crank shaft to rotate with respect to the clutch housing, and wherein the locking enclosure is configured such that the at least one spring member does not make direct contact with the at least one ball bearing.

2. The locking enclosure of claim 1, wherein the clutch mechanism comprises a plurality of ball bearing openings positioned within the clutch housing and a plurality of ball bearings positioned with the plurality of ball bearing openings.

3. The locking enclosure of claim 1, wherein the clutch mechanism further comprises a clutch cover coupled with the clutch housing.

4. The locking enclosure of claim 1, wherein the at least one spring member comprises a Belleville washer.

5. The locking enclosure of claim 4, wherein the at least one spring member comprises a plurality of Belleville washers.

6. The locking enclosure of claim 1, further comprising a rotatable crank plate rotatably coupled about the crank shaft, wherein the rotatable crank plate is coupled with at least one locking bolt such that rotation of the rotatable crank plate results in movement of the at least one locking bolt.

7. The locking enclosure of claim 6, further comprising an actuation member coupled with the rotatable crank plate, wherein the actuation member is configured such that rotation of the rotatable crank plate results in movement of the actuation member, and wherein the actuation member is coupled with the at least one locking bolt such that movement of the actuation member results in movement of the at least one locking bolt.

8. The locking enclosure of claim 7, wherein the locking mechanism comprises a locked configuration and an unlocked configuration, and wherein the rotatable crank plate is configured to at least substantially overlap with the actuation member when the locking mechanism is in the locked configuration.

9. The locking enclosure of claim 7, further comprising a second actuation member coupled with the rotatable crank plate, wherein the second actuation member is configured such that rotation of the rotatable crank plate results in movement of the second actuation member, and wherein the second actuation member is coupled with a second locking bolt separate from the at least one locking bolt such that movement of the actuation member results in movement of the second locking bolt.

10. The locking enclosure of claim 7, wherein the actuation member is configured to move in a translational manner in response to rotation of the rotatable crank plate.

11. The locking enclosure of claim 10, wherein the actuation member comprises an L-shaped slot.

12. The locking enclosure of claim 11, wherein the crank shaft extends through the L-shaped slot, further comprising a coupling member for coupling the rotatable crank plate with the actuation member, wherein the L-shaped slot comprises a first leg and a second leg, wherein the coupling member extends through the first leg, wherein the crank shaft extends through the second leg, and wherein the locking enclosure is configured such that, as the crank handle is turned, the coupling member moves from a first end of the first leg to a second end of the first leg opposite from the first end, and such that the crank shaft moves from a first end of the second leg to a second end of the second leg opposite from the first end.

13. The locking enclosure of claim 1, further comprising a second plurality of ball bearing openings, wherein the clutch mechanism comprises a plurality of ball bearing openings positioned within the clutch housing and a plurality of ball bearings positioned with the plurality of ball bearing openings, and wherein the plurality of ball bearings is configured to be positioned within and partially extend through the second plurality of ball bearing openings in an engaged configuration of the clutch mechanism.

14. The locking enclosure of claim 13, wherein each of the second plurality of ball bearing openings has a diameter less than a diameter of each of the plurality of ball bearing openings such that each of the plurality of ball bearings is prevented from passing through each of the second plurality of ball bearing openings.

15. The locking enclosure of claim 13, further comprising at least one of a rotatable crank plate and a clutch coupling member, wherein the second plurality of ball bearing openings are formed in the at least one of a rotatable crank plate and a clutch coupling member.

16. The locking enclosure of claim 13, wherein the clutch mechanism is configured to operate in an engaged configuration and a disengaged configuration, wherein each of the plurality of ball bearings is configured to recede from the second plurality of ball bearing openings during a transition from the engaged configuration to the disengaged configuration such that each of the plurality of ball bearings can be received in a different ball bearing opening of the second plurality of ball bearing openings during a transition from the disengaged configuration to the engaged configuration.

17. The locking enclosure of claim 1, wherein the clutch mechanism is configured to operate in an engaged configuration and a disengaged configuration, wherein, in the engaged configuration, the clutch mechanism is configured such that torque from the at least one ball bearing can be transferred to the crank shaft, and wherein, in the disengaged configuration, the clutch mechanism is configured to disengage the at least one ball bearing from the crank shaft such that torque is not transferred to the crank shaft from the at least one ball bearing.

18. The locking enclosure of claim 1, further comprising a clutch cover positioned in between the at least one ball bearing and the at least one spring member, wherein the clutch cover is configured to apply force from the at least one spring member to the at least one ball bearing.

19. A locking enclosure, comprising:
a locking element configured to lock the locking enclosure upon rotation of the locking element; and
a clutch mechanism coupled with the locking element and configured to have an engaged configuration and a disengaged configuration,
wherein the clutch mechanism comprises:
a clutch housing comprising at least one ball bearing opening extending fully through the clutch housing; and
at least one ball bearing configured to fit within the at least one ball bearing opening;
wherein, in the engaged configuration, the clutch mechanism is configured to transfer torque to the locking element at least partially using the at least one ball bearing, and
wherein, in the disengaged configuration, the clutch mechanism is configured to disengage the at least one ball bearing from the locking element such that torque is not transferred to the locking element from the at least one ball bearing.

20. The locking enclosure of claim 19, further comprising a crank shaft, wherein the clutch mechanism is configured to rotate with respect to the crank shaft in the engaged configuration.

21. The locking enclosure of claim 19, wherein the locking element comprises a crank plate.

22. The locking enclosure of claim 19, wherein the clutch housing comprises a thickness, wherein the at least one ball bearing comprises a diameter, and wherein the diameter of the at least one ball bearing is greater than the thickness of the clutch housing.

23. The locking enclosure of claim 19, wherein the at least one ball bearing comprises a plurality of ball bearings, and further comprising:
at least one spring member; and
a clutch cover positioned in between the plurality of ball bearings and the at least one spring member, wherein the clutch cover is configured to apply force from the at least one spring member to the plurality of ball bearings.

24. The locking enclosure of claim 21, further comprising a clutch coupling member positioned in between the clutch mechanism and the crank plate, wherein the clutch coupling member comprises at least one ball bearing opening configured to receive the at least one ball bearing, and wherein the clutch coupling member is configured to transfer torque from the at least one ball bearing to the crank plate during the engaged configuration.

25. The locking enclosure of claim 24, wherein the clutch coupling member is rigidly coupled with the crank plate such that the crank plate and the clutch coupling member are configured to rotate together, and wherein the clutch coupling member is coupled with the clutch mechanism such that, in the engaged configuration, the clutch mechanism rotates together with the clutch coupling member and, in the disengaged configuration, the clutch mechanism can rotate with respect to the clutch coupling member.

26. The locking enclosure of claim 25, wherein the at least one ball bearing is positioned within the at least one ball bearing opening in the engaged configuration, and wherein the at least one ball bearing opening has a diameter less than a diameter of the at least one ball bearing such that the at least one ball bearing cannot pass through the at least one ball bearing opening.

27. The locking enclosure of claim 21, further comprising an actuation member coupled with the crank plate, wherein the actuation member comprises an L-shaped slot.

28. The locking enclosure of claim 27, wherein the crank shaft extends through the L-shaped slot.

29. The locking enclosure of claim 28, further comprising a coupling member for coupling the crank plate with the actuation member, wherein the L-shaped slot comprises a first leg and a second leg, wherein the coupling member extends through the first leg, wherein the crank shaft extends through the second leg, and wherein the locking enclosure is configured such that, as the crank shaft rotates, the coupling member moves from a first end of the first leg to a second end of the first leg opposite from the first end, and such that the crank shaft moves from a first end of the second leg to a second end of the second leg opposite from the first end.

30. A safe, comprising:
a safe door;
a crank handle positioned on a first side of the safe door;
a crank shaft coupled with the crank and configured to rotate with the crank handle, wherein the crank shaft extends through the safe door to a second side of the safe door opposite from the first side;
a crank plate coupled with the crank shaft;
a locking mechanism positioned on the second side of the safe door, wherein the crank shaft is configured such that, following an unlocking of the locking mechanism, rotation of the crank handle unlocks the safe to allow for access to an interior of the safe; and
a clutch mechanism coupled with the crank shaft and configured to have an engaged configuration and a disengaged configuration, wherein, in the engaged configuration, the clutch mechanism is configured to transfer torque from the crank shaft to the crank plate, wherein, in the disengaged configuration, the clutch mechanism is configured to allow the crank shaft to rotate with respect to the crank plate such that torque from the crank shaft is not transferred to the crank plate, wherein the clutch mechanism comprises:
a clutch housing;
a plurality of ball bearing openings positioned within the clutch housing;
a plurality of ball bearings positioned within the plurality of ball bearing openings; and
a plurality of stacked spring members coupled to the clutch housing,
wherein the plurality of spring members are configured to allow for tuning a sensitivity of the clutch mechanism,
wherein the clutch mechanism is configured such that, upon application of a predetermined amount of torque, the clutch mechanism is configured to enter the disengaged configuration, and
wherein the predetermined amount of torque varies depending upon at least one of the number of spring members and the orientation of the spring members relative to one another.

31. The safe of claim 30, wherein the plurality of spring members comprise Belleville washers.

32. The safe of claim 30, further comprising a plate positioned in between the plurality of ball bearings and the plurality of spring members, wherein the plate is configured to apply force from the plurality of spring members to the plurality of ball bearings.

33. The safe of claim 32, wherein the plate comprises a clutch cover, and wherein the plurality of ball bearing openings comprise thru-holes.

34. The safe of claim 33, wherein each of the plurality of ball bearings comprises a diameter, wherein each of the thru-holes comprises a length, and wherein the diameter of the plurality of ball bearings is greater than the length of the thru-holes.

* * * * *